United States Patent [19]

Lo

[11] Patent Number: 5,442,513
[45] Date of Patent: Aug. 15, 1995

[54] HARD DISK DRIVE AND CASING SLIDABLY RECEIVED WITHIN FRAME HAVING DOUBLE-SWINGING DOOR AND LOCK

[76] Inventor: Hsin Y. Lo, No. 33-5, Hsia Chuang Tzu, Kuan Yin Hsiang, Taoyuan Hsien, Taiwan

[21] Appl. No.: 198,304

[22] Filed: Feb. 18, 1994

[51] Int. Cl.⁶ .......................... G06F 1/16; H95K 7/10
[52] U.S. Cl. .................... 361/685; 361/727; 361/759
[58] Field of Search ............ 364/708.1; 360/137; 439/928, 137, 138; 361/683–685, 724–727, 740, 747, 759, 756, 801; 312/223.2

[56] References Cited

U.S. PATENT DOCUMENTS

| | | | |
|---|---|---|---|
| 4,941,841 | 7/1990 | Darcy et al. | 361/685 |
| 5,035,633 | 7/1991 | Kobayashi et al. | 439/138 X |
| 5,041,924 | 3/1991 | Blackborow et al. | 361/685 X |
| 5,265,951 | 11/1993 | Kumar | 312/223.2 |

*Primary Examiner*—Michael W. Phillips
*Attorney, Agent, or Firm*—Browdy and Neimark

[57] ABSTRACT

A hard disk/drive includes an open base frame fastened to the hard disk/drive slot of a computer and having a double-swinging door, which closes the hard disk/drive slot, and a lock device in front of the double-swinging door at one side, a sliding frame made to slide in the open base frame, and a casing fastened to the sliding frame on the inside, wherein when the sliding frame is inserted into the open base frame, the double-swinging door is opened for permitting the sliding frame and the casing to be received inside the open base frame, and the lock device automatically locks the sliding frame inside the open base frame. When the lock device is unlocked and the casing is moved out of the open base frame by the sliding frame, the double-swinging door closes the hard disk/drive slot again.

1 Claim, 11 Drawing Sheets

HARD DISK DRIVE AND CASING SLIDABLY RECEIVED WITHIN FRAME HAVING DOUBLE-SWINGING DOOR AND LOCK

BACKGROUND OF THE INVENTION

The present invention relates to an improved structure of hard disk/drive which can be conveniently removed from the mainframe of the computer for a replacement or repair work without dismantling the shell of the mainframe.

The hard disk/drive in a personal computer is generally fixed on the inside. When removing the hard disk/drive from the computer, the shell of the mainframe of the computer must be dismantled. Nowadays, various sliding box type hard disk/drives have been disclosed. Exemplars of these sliding box type hard disk/drives are seen in U.S. Pat. Nos. 5,233,594; 930,803; 4,982,303; 910,101; Des. 308,502; 900,522; 311,737 901,030. These sliding box type hard disk/drives are made to slide in and out of the mainframe of the computer, and therefore they can be conveniently removed from the hard disk/drive slot on the front side of the mainframe of the computer for a replacement or repair work. However, the hard disk/drive slot on the front side of the mainframe will be left open when the hard disk/drive is removed, and dust may enter the mainframe and cover on the parts or the electric circuit of the computer. Another drawback of these conventional sliding box type hard disk/drives is that they may displace after long use causing reading errors.

SUMMARY OF THE INVENTION

The present invention is intended to provide an improved structure of hard disk/drive which eliminates the aforesaid drawbacks. According to one aspect of the present invention, the hard disk/drive comprises an open base frame fastened to the hard disk/drive slot of a computer and having a double-swinging door, which closes the hard disk/drive slot, and a lock device in front of the double-swinging door at one side, a sliding frame made to slide in the open base frame, and a casing fastened to the sliding frame on the inside, wherein when the sliding frame is inserted into the open base frame, the double-swinging door is opened for permitting the sliding frame and the casing to be received inside the open base frame, and the lock device automatically locks the sliding frame inside the open base frame; when the lock device is unlocked and the casing is moved out of the open base frame by the sliding frame, the double-swinging door closes the hard disk/drive slot again to prohibit dust from entering the computer. According to another aspect of the present invention, horizontal blocks are made on the open base frame at two opposite sides at different elevations which permits the sliding frame 3 move stably in course when the sliding frame 3 is inserted into or removed out of the open base frame.

DETAILED DESCRIPTION OF THE PREFERRED EMBODIMENT

Figure 1:
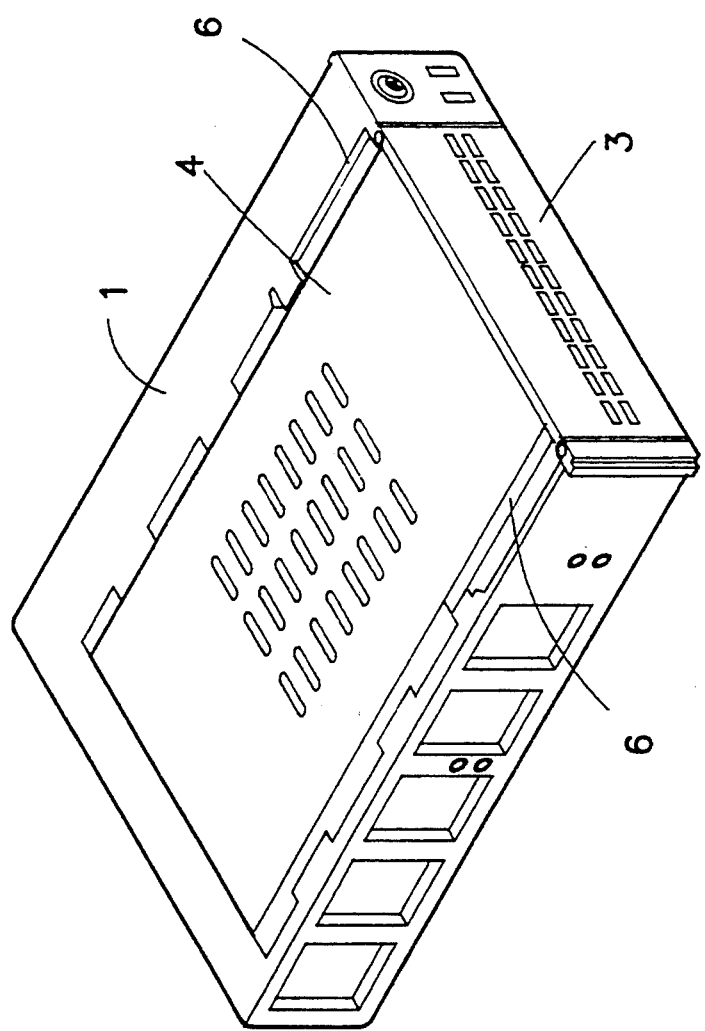
FIG. 1 is an elevational view of a hard disk/drive according to the preferred embodiment of the present invention.

Referring to FIGS. 1, 2 and 2A-2F, the hard disk/drive of the preferred embodiment of the present invention is generally comprised of a base frame 1, a casing 2, a sliding frame 3, a top cover 4, a bottom cover 5, a double-swinging door 6, and a lock device 7.

Figure 2:
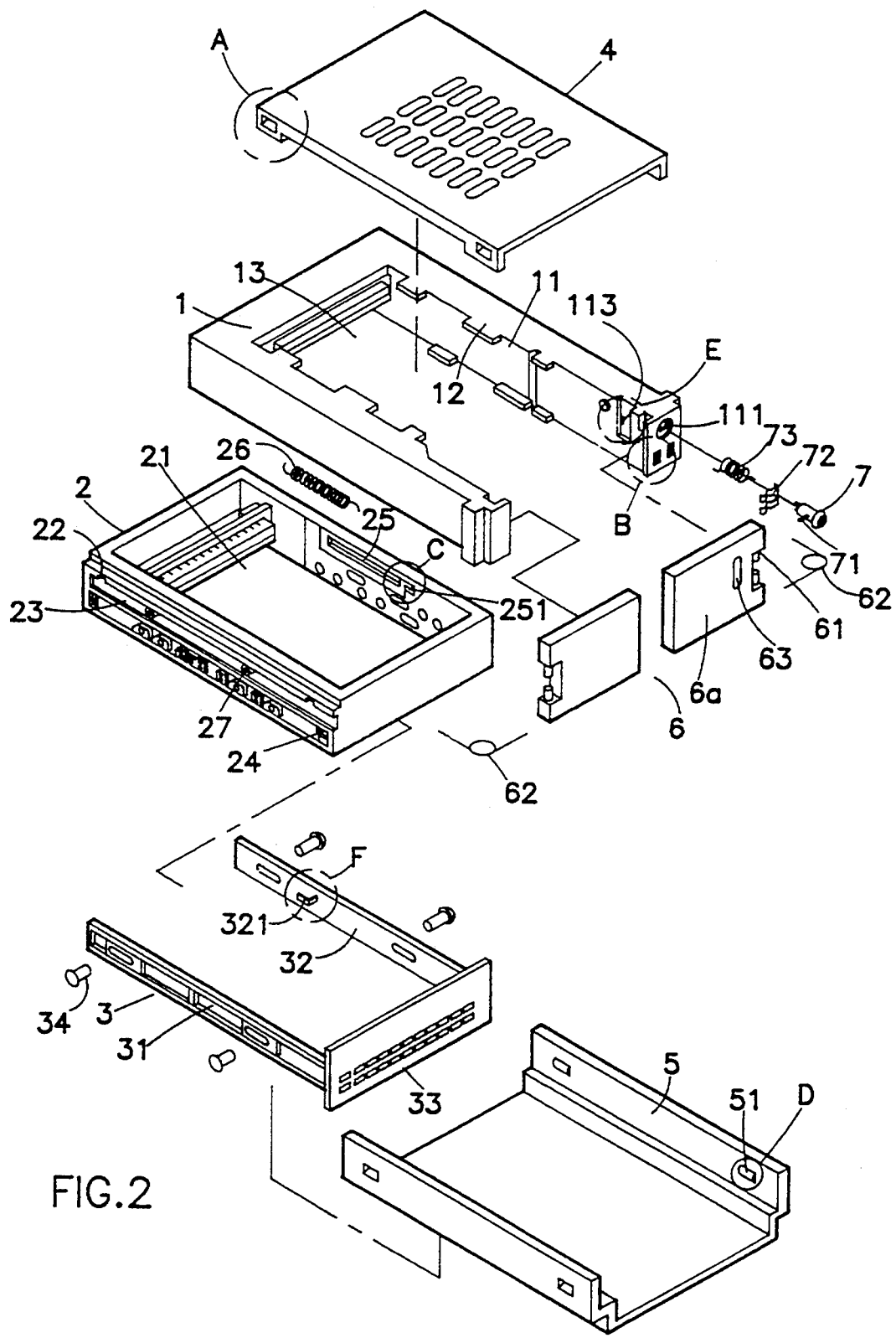
FIG. 2 is an exploded view of the hard disk/drive shown in FIG. 1.
Figure 2A:
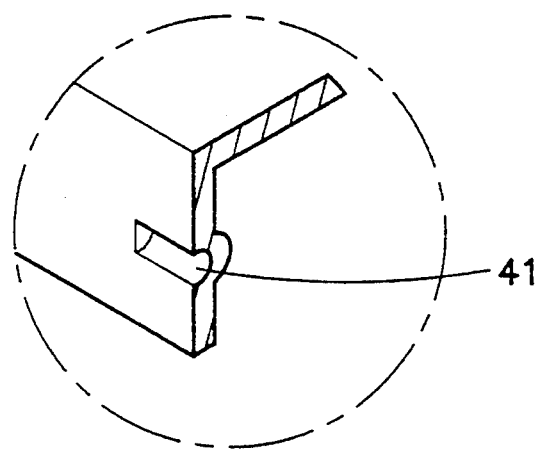
FIG. 2A is an enlarged view of circled area A of FIG. 2.
Figure 2B:
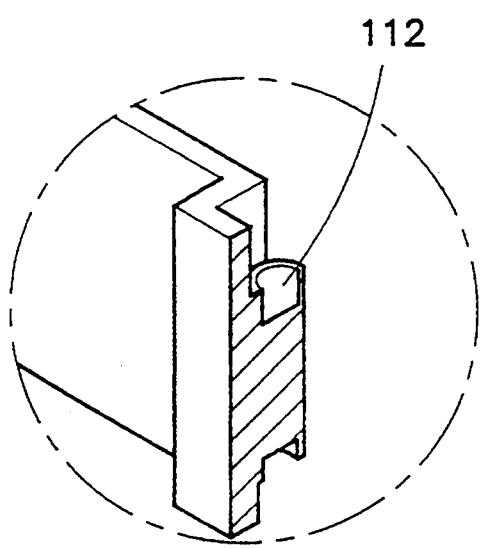
FIG. 2B is an enlarged view of a cross-section through circled area B of FIG. 2.
Figure 2C:
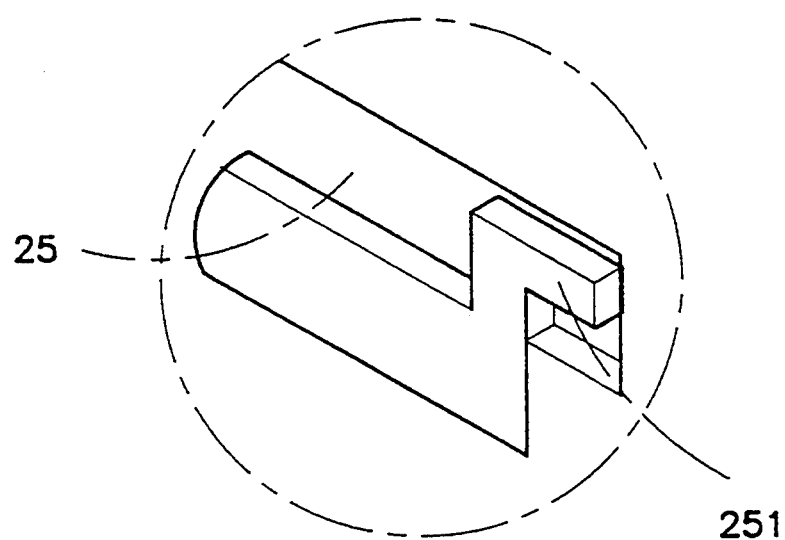
FIG. 2C is an enlarged view of circled area C of FIG. 2.
Figure 2D:
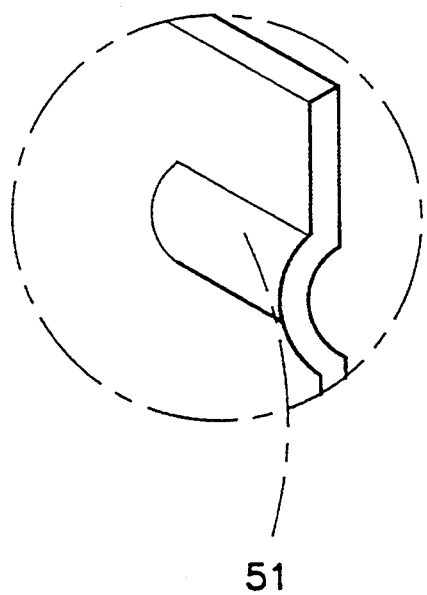
FIG. 2D an enlarged view of circled area D of FIG. 2.
Figure 2E:
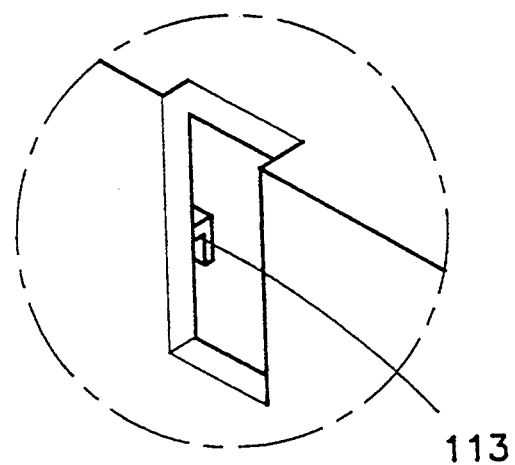
FIG. 2E is an enlarged view of circled area E of FIG. 2.
Figure 2F:
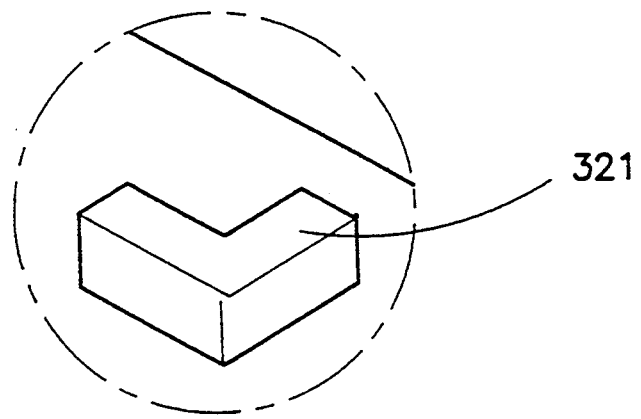
FIG. 2F is an enlarged view of circled area F of FIG. 2.
Figure 3:
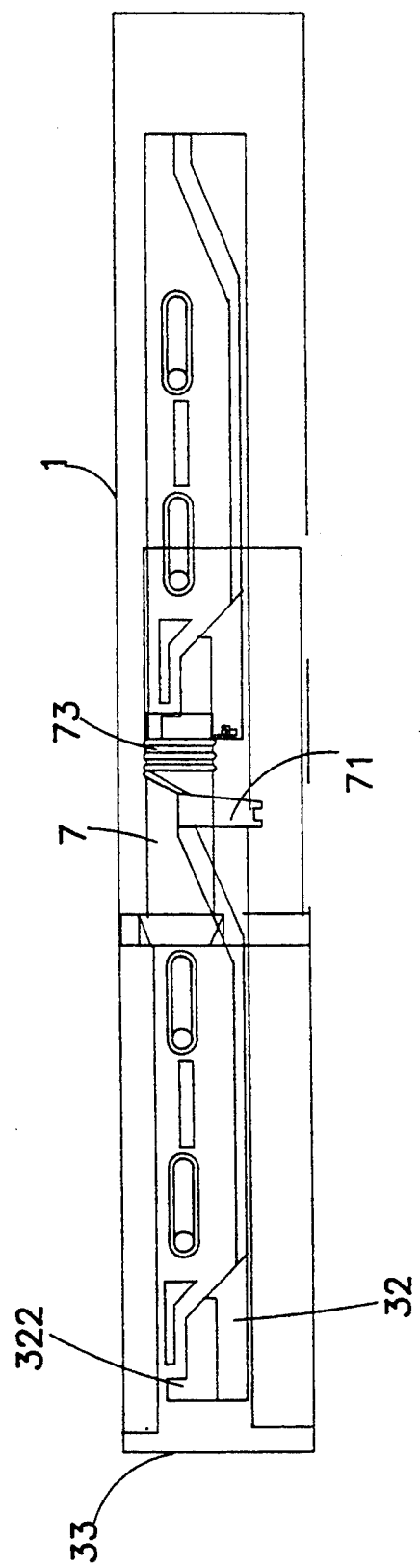
FIG. 3 is a side elevation view of the hard disk/drive shown in FIG. 1.
Figure 4:
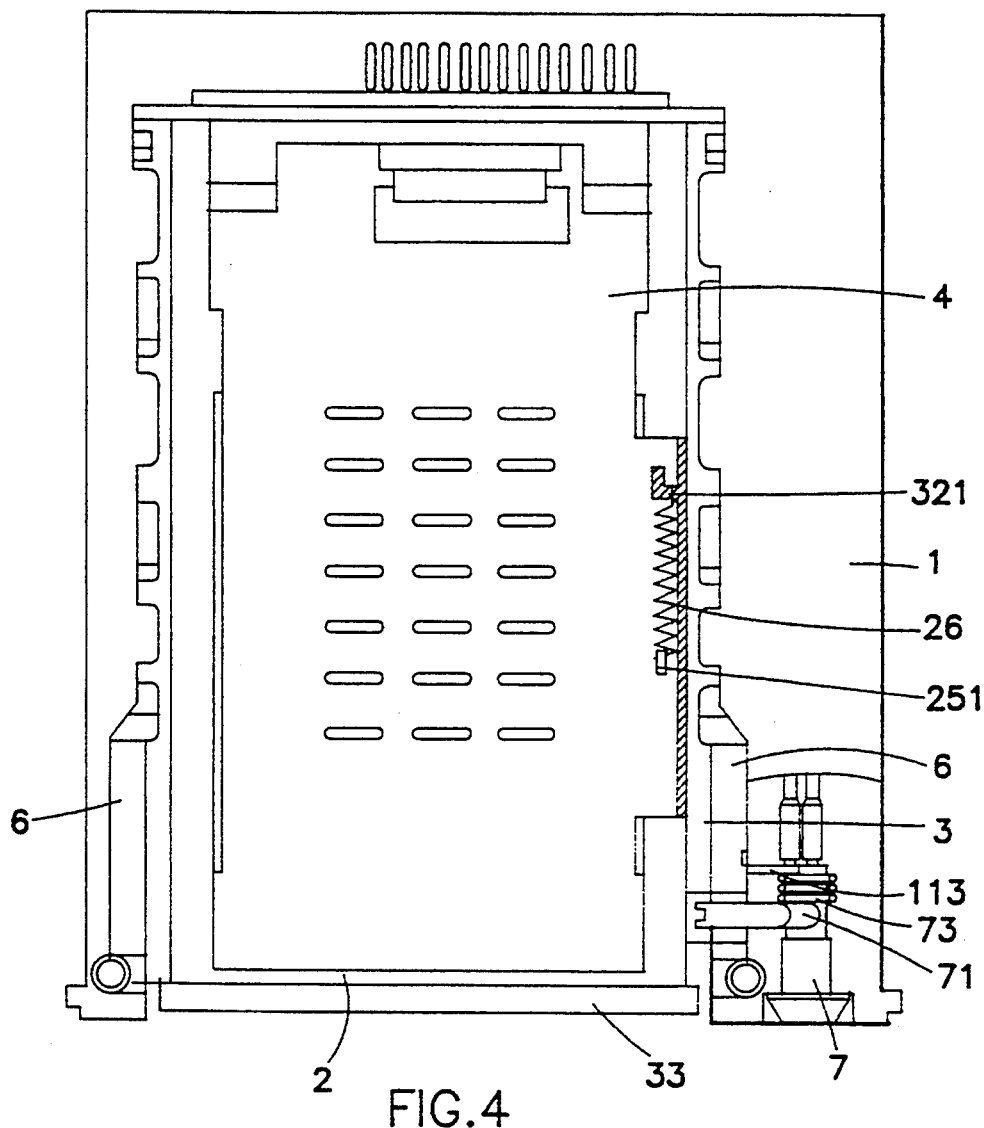
FIG. 4 a top plan view of the hard disk/drive shown in FIG. 1, showing the sliding frame locked inside the base frame by the lock device.
Figure 4A:
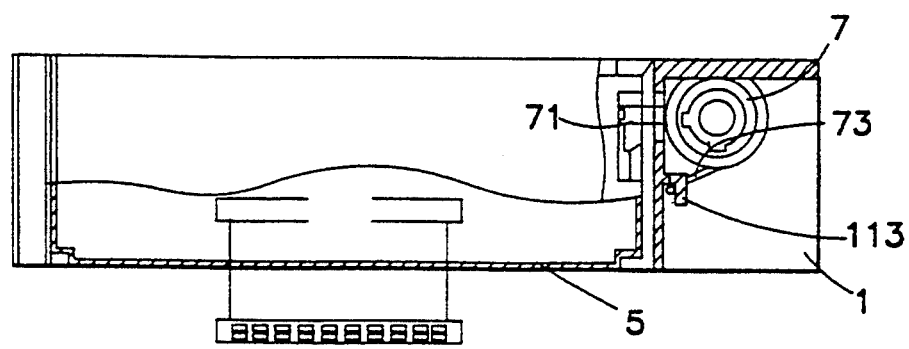
FIG. 4A is a side elevation view of the device of FIG. 4.
Figure 5:
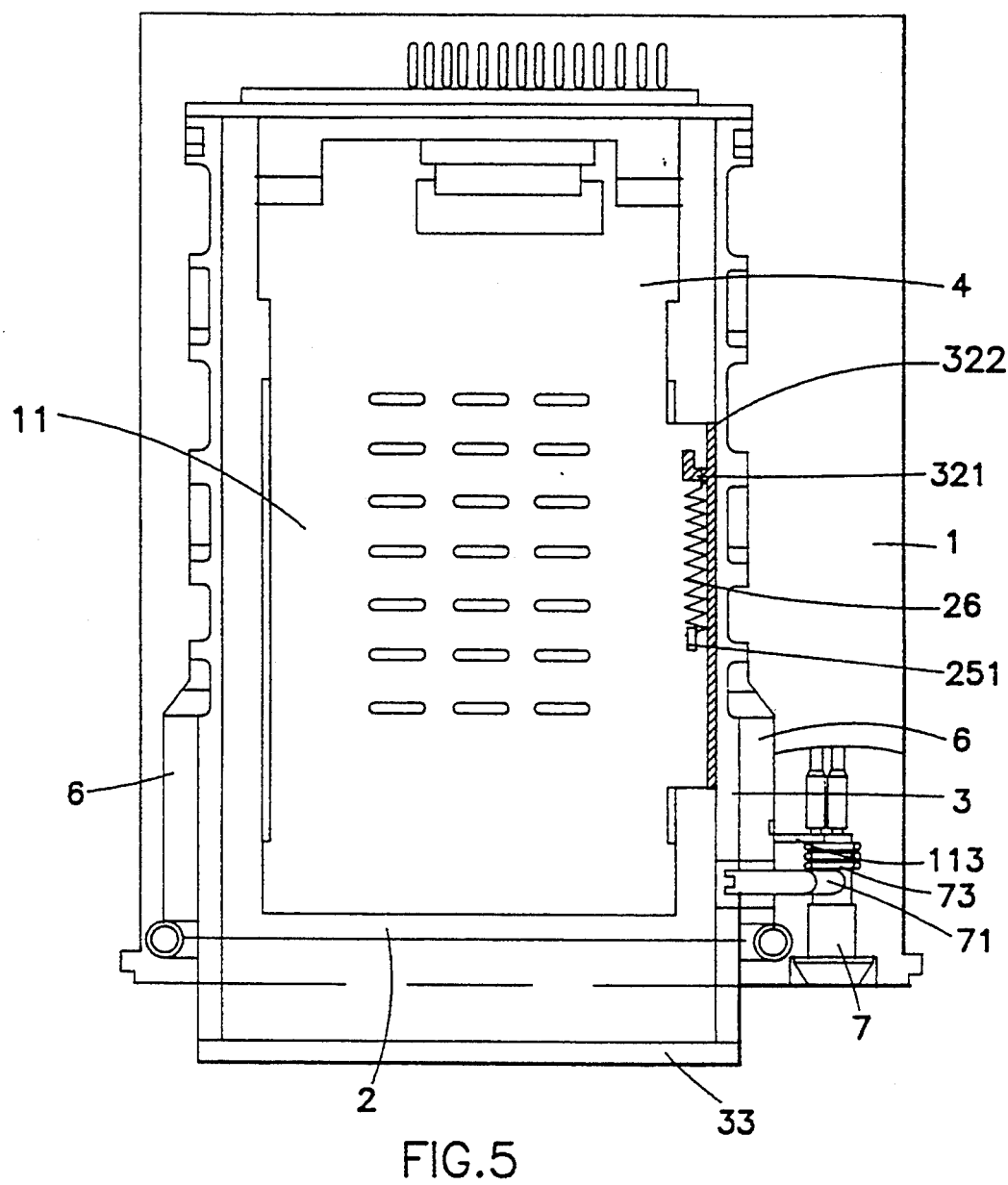
FIG. 5 is similar to FIG. 4, but showing the lock device unlocked.
Figure 5A:
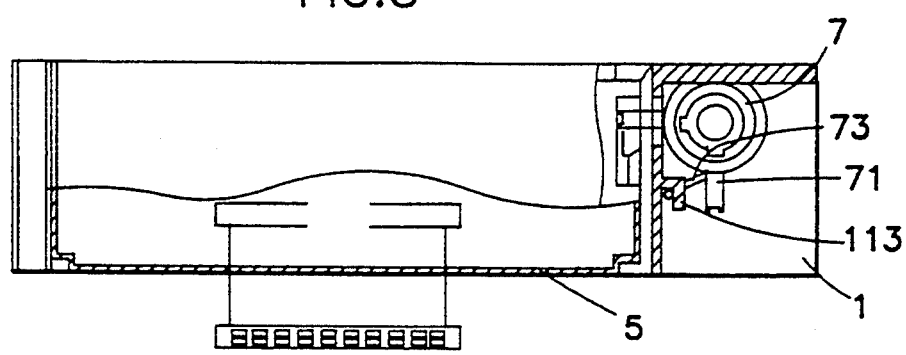
FIG. 5A is a side elevation view of the device of FIG. 5.
Figure 6:
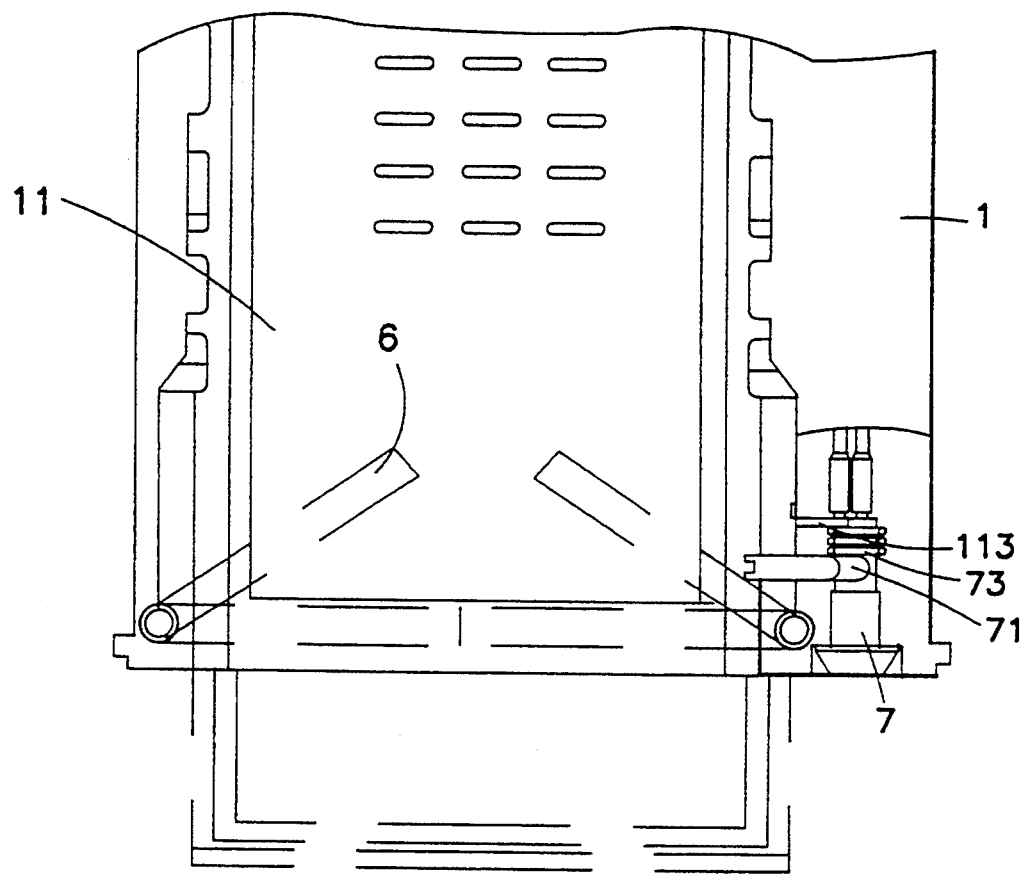
FIG. 6 is another top plan view of the hard disk/drive shown in FIG. 1, showing the double-swinging door opened.
Figure 6A:
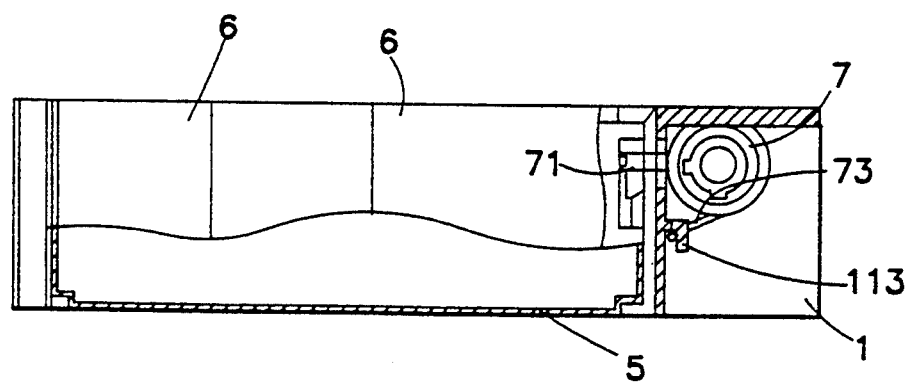
FIG. 6A is a side elevation view of the device of FIG. 6.
Figure 7:
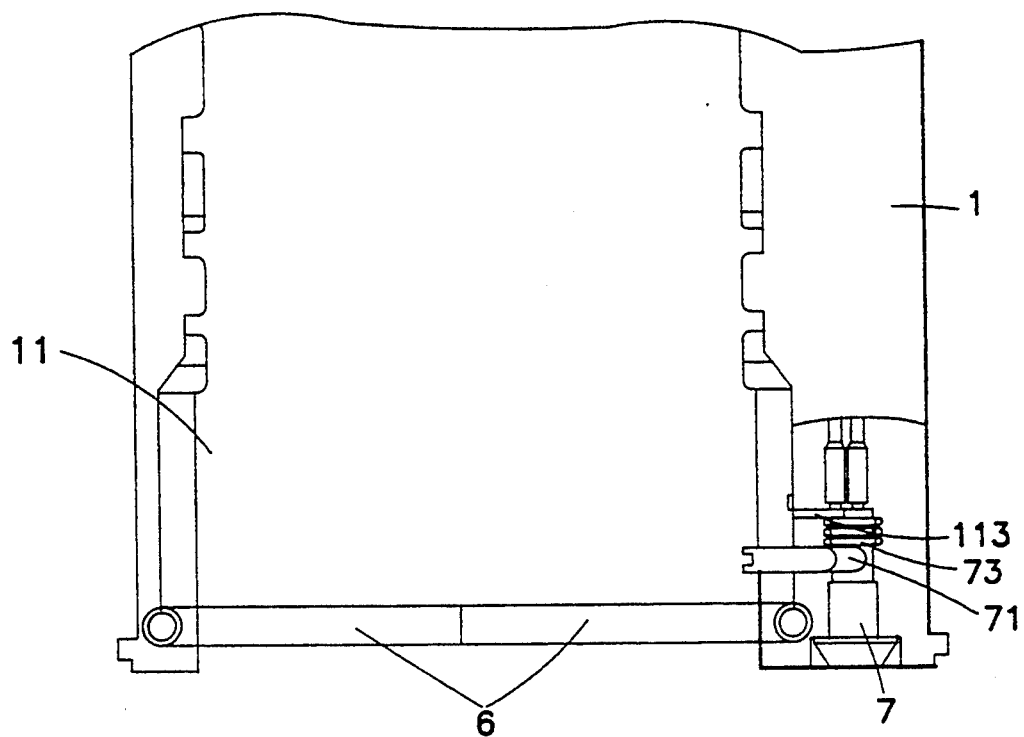
FIG. 7 is another top plan view of the hard disk/drive shown in FIG. 1, showing the double-swinging door closed.
Figure 7A:
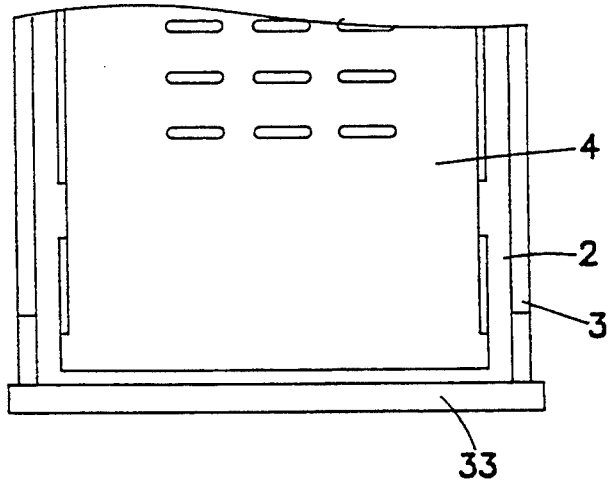
FIG. 7A is a side elevation view of the device of FIG. 7.
Figure 7A:
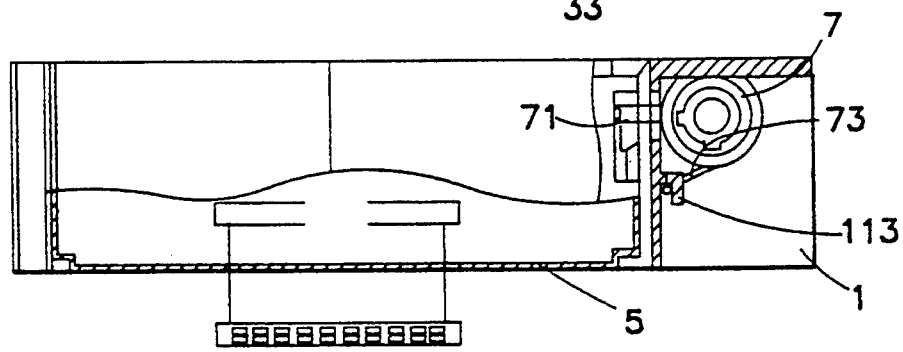
Figure 8:
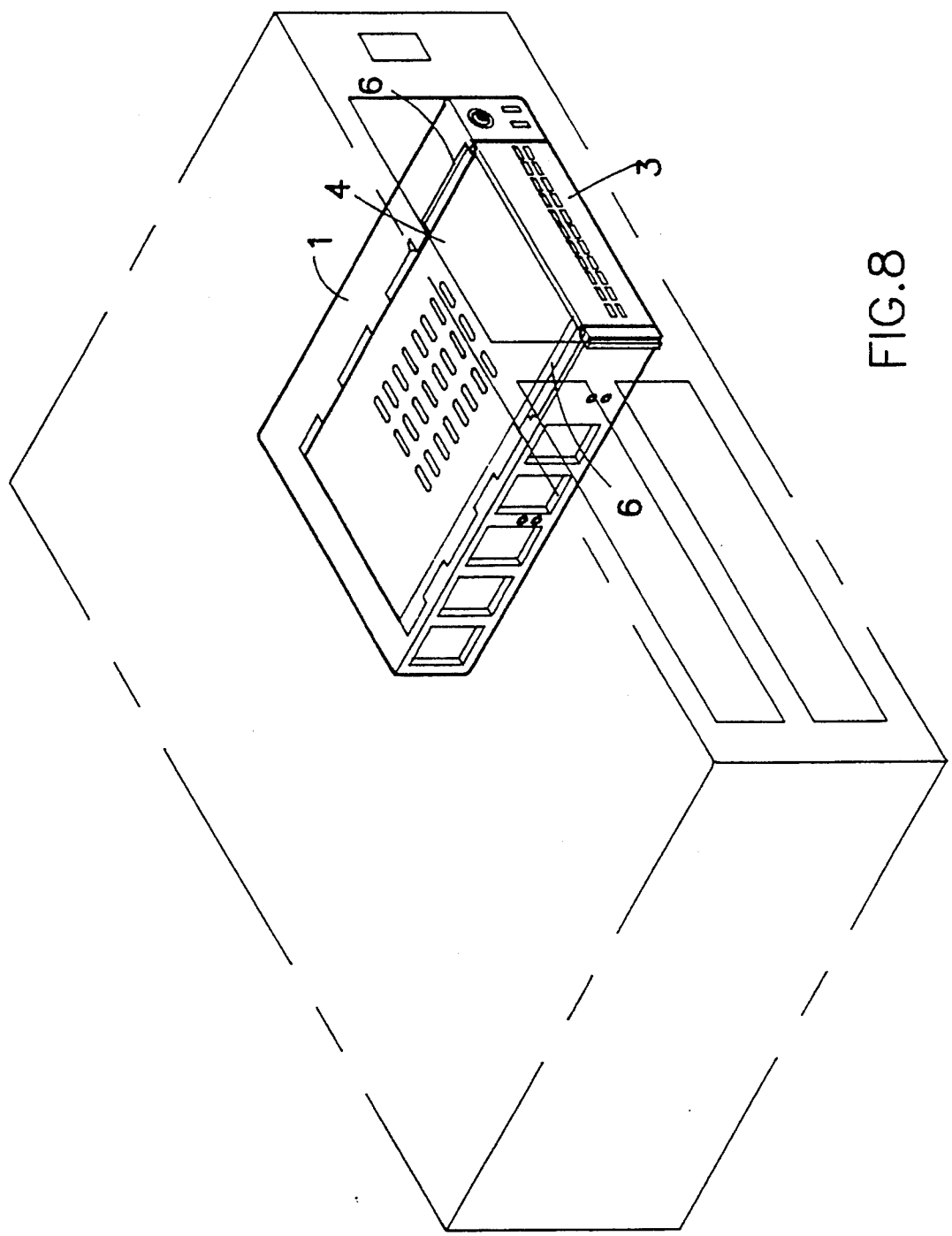
FIG. 8 is a perspective view showing the hard disk/drive of FIG. 1 installed in the mainframe.

Referring to FIGS. 3 and 4 and FIGS. 1, 2 and 2A-2F; again, the base frame 1 comprises a longitudinal opening 13, which receives the casing 2 and the sliding frame 3, two sets of vertically spaced horizontal blocks 12 disposed at two opposite sides and respectively projecting into the longitudinal opening 13, two sliding ways 11 longitudinally disposed at two opposite sides between either set of vertically spaced horizontal blocks 12, two barrels 112 respectively disposed in front of either sliding way 11, a lock hole 111 disposed in front of one barrel 112, and a hook 113 disposed inside the lock hole 111. The casing 2 comprises a holding chamber 21 for loading the electric circuit assembly of the hard disk/drive from the top, two horizontal guide grooves 23 longitudinally disposed on two opposite long sides thereof, a plurality of first retaining holes 22 respectively disposed on the two opposite long sides at the top and communicating with either guide groove 23, a plurality of through holes 27 respectively made through either sliding groove 23, a plurality of second retaining holes 24 disposed on the two opposite long sides at the bottom, a track 25 longitudinally disposed at one side, a tension spring 26 received in the track 25 and having one end fastened to a hook 251 (FIG. 2C) in the track 25 and an opposite end connected to the sliding frame 3. The sliding frame 3 comprises a front panel 33 and two side bars 31;32 perpendicularly extended from two opposite ends of the front panel 33 in the same direction. The side bars 31;32 of the sliding frame 3 are respectively inserted into the guide grooves 23 on the casing 2 and then fastened to the through holes 27 by pins 34. One side bar 32 has a hook 321 (FIG. 2F) on the side, to which the tension spring 26 is connected, and a guide groove 322 (FIG. 3) on the outside. The top cover 4 is covered over the casing 2 at the top, having a plurality of raised portions 41 (FIG. 2A) spaced at two opposite sides and respectively engaged into the first retaining holes 22. The bottom cover 5 is covered over the casing 2 at the bottom, having a plurality of raised portions 51 (FIG. 2D) spaced at two opposite sides and respectively engaged into the second retaining holes 24. The double-swinging door 6 is comprised of two door panels 6a, each door panel 6a having two vertically spaced pivot pins 61 respectively fastened to either barrel 112 (FIG. 2B) and being actuated by a respective spring 62. The spring 62 is mounted around either pivot pin 61, having one end stopped against the inside wall of the respective door panel 6a and an opposite end stopped against the base frame 1. Therefore, the spring 62 gives an outward pressure to the respective door panel 6a. The lock device 7 is mounted with a spring 73 and retained in the lock hole 111 on the base frame 1 by a spring plate 72, having a side lock bolt 71 for locking the sliding frame 3 inside the base frame 1. The spring 73 has one end fastened to the lock device 7 and an opposite end fastened to the hook 113 (FIG. 2E). Furthermore, one door panel 6a has an oblong hole 63 at a suitable location for allowing the lock bolt 71 of the lock device 7 to be moved freely.

Referring to FIGS. 2, 2A–2F, 3, 7 and 8 and FIGS. 5 and 6 again, when the two side bars 31 of the sliding frame 3 are inserted into the sliding ways 11, the two door panels 6a of the double-swinging door 6 are respectively turned to the two opposite sides of the base frame 1, and the lock bolt 71 of the lock device 7 is guided into the guide groove 322 (FIG. 3) to lock the sliding frame 3 in position. When a key is inserted into the lock device 7 and turned counter-clockwise, the lock bolt 71 is moved downward and disconnected from the guide groove 322, causing the sliding frame 3 to be ejected out of the base frame 1 (by means of the effect of the tension spring 26), and therefore the casing 2 can be removed from the base frame 1 by the sliding frame 3. When the sliding frame 3 is moved back into the longitudinal opening 13 of the base frame 1, the spring 73 returns to its former shape causing the lock bolt 71 to be engaged into the guide groove 322 again.

What is claimed is:

1. A hard disk drive comprising:

a base frame fastenable in a hard disk drive slot of a mainframe of a computer, said base frame comprising a longitudinal opening, a double-swinging door to close the hard disk drive slot, two sets of vertically spaced horizontal blocks disposed at two opposite sides and respectively projecting into said longitudinal opening and defining two opposite sliding ways, a lock hole disposed at one side of said double-swinging door;

a casing received inside said base frame within said longitudinal opening, said casing comprising a holding chamber for loading the electric circuit assembly of the hard disk drive from the top, two horizontal guide grooves longitudinally disposed on two opposite long sides thereof, a plurality of first retaining holes respectively disposed on the two opposite long sides at the top, a plurality of through holes respectively made through each sliding groove, a plurality of second retaining holes disposed on the two opposite long sides at the bottom, a track longitudinally disposed at one side, and a tension spring received in said track and having one end fastened to a hook in said track;

a sliding frame connected to said casing and adapted to slide in said sliding ways of said base frame, said sliding frame comprising a front panel, a first slide bar and a second slide bar perpendicularly extending from two opposite ends of said front panel in the same direction, said first and second side bars being respectively inserted into the guide grooves on said casing and movably connected to the trough holes in the guide grooves on said casing by pins, said second side bar having a hook on the side connected to the opposite end of the tension spring being received in said track of said casing, and a guide groove on the outside;

a top cover covered over said casing at the top, having a plurality of raised portions spaced at two opposite sides and respectively engaged into the first retaining holes on said casing;

a bottom cover covered over said casing at the bottom, having a plurality of raised portions spaced at two opposite sides and respectively engaged into the second retaining holes on said casing;

a lock device supported on a spring and retained in the lock hole on said base frame by a spring plate, having a side lock bolt for locking said sliding frame inside said base frame; and wherein when said sliding frame is inserted into the sliding ways of said base frame and supported between said horizontal blocks of said base frame, said double-swinging door is opened and received in the sliding ways of said base frame, and the lock bolt of said lock device is guided into the guide groove on said second side bar of said sliding frame to lock said sliding frame inside said base frame; when said lock device is turned by a key to release said lock bolt from the guide groove on said second side bar of said sliding frame, the spring in said track of said casing gives an outward pressure to said sliding frame causing said sliding frame to be ejected out of said base frame.

* * * * *